United States Patent
Pfeiffer et al.

(10) Patent No.: US 10,160,139 B2
(45) Date of Patent: Dec. 25, 2018

(54) METHOD FOR SPEED CONTROLLING A POWER TOOL AND RELATED POWER TOOL

(71) Applicant: Hilti Aktiengesellschaft, Schaan (LI)

(72) Inventors: Ralf Pfeiffer, Landsberg (DE); Tobias Drexl, Weil (DE)

(73) Assignee: Hilti Aktiengesellschaft, Schaan (LI)

( * ) Notice: Subject to any disclaimer, the term of this patent is extended or adjusted under 35 U.S.C. 154(b) by 190 days.

(21) Appl. No.: 14/905,721

(22) PCT Filed: Jul. 18, 2014

(86) PCT No.: PCT/EP2014/065469
§ 371 (c)(1),
(2) Date: Jan. 15, 2016

(87) PCT Pub. No.: WO2015/007875
PCT Pub. Date: Jan. 22, 2015

(65) Prior Publication Data
US 2016/0151934 A1    Jun. 2, 2016

(30) Foreign Application Priority Data
Jul. 18, 2013    (EP) .................................... 13176992

(51) Int. Cl.
*G06F 19/00*    (2018.01)
*B28D 7/00*    (2006.01)
(Continued)

(52) U.S. Cl.
CPC ............. *B28D 7/005* (2013.01); *B23Q 15/08* (2013.01); *B23Q 17/12* (2013.01); *B28D 1/14* (2013.01);
(Continued)

(58) Field of Classification Search
CPC ...................................................... B23Q 17/12
(Continued)

(56) References Cited

U.S. PATENT DOCUMENTS

| | | | |
|---|---|---|---|
| 2010/0193205 A1 | 8/2010 | Cecchin et al. | |
| 2014/0196920 A1* | 7/2014 | Wirnitzer | B25F 5/00 |
| | | | 173/1 |
| 2015/0129248 A1* | 5/2015 | Nitsche | B25D 16/006 |
| | | | 171/1 |

FOREIGN PATENT DOCUMENTS

| | | |
|---|---|---|
| DE | 102009045758 | 4/2011 |
| DE | 102011089343 | 6/2013 |

(Continued)

*Primary Examiner* — Hoai V Ho
(74) *Attorney, Agent, or Firm* — Davidson, Davidson & Kappel, LCC (57) ABSTRACT

A method to control a power tool including the method steps:
specifying the rotational speed of the drive at a first value,
measuring a first amplitude of a signal,
filtering the signal within a frequency range,
measuring a second amplitude of the filtered signal,
reducing the rotational speed of the drive to a second value if the first amplitude exceeds a first quantity and if the second amplitude exceeds a second quantity, and
incrementally increasing the rotational speed of the drive to the first value, whereby each incremental increase of the rotational speed only takes place once the first amplitude remains below the first quantity for a time interval, and the second amplitude remains below the second quantity.

A power tool that uses this method, includes:
a drive,
an acceleration sensor
a filter, and
a control unit.

8 Claims, 5 Drawing Sheets

(51) Int. Cl.
*G05B 19/416* (2006.01)
*B23Q 15/08* (2006.01)
*B23Q 17/12* (2006.01)
*B28D 1/14* (2006.01)

(52) U.S. Cl.
CPC ...... *G05B 19/416* (2013.01); *B25D 2250/201* (2013.01); *B25D 2250/221* (2013.01); *G05B 2219/49074* (2013.01); *G05B 2219/50041* (2013.01)

(58) Field of Classification Search
USPC ........................................................ 700/173
See application file for complete search history.

(56) References Cited

FOREIGN PATENT DOCUMENTS

EP         1607186        12/2005
WO     2013087825 A1    6/2013

* cited by examiner

METHOD FOR SPEED CONTROLLING A POWER TOOL AND RELATED POWER TOOL

The present invention relates to a method to control a power tool comprising a drive to drive a tool and a control unit for when a workpiece is being worked.

The invention also relates to a power tool that uses this method.

The power tool can be, for instance, a core drilling machine used for core drilling.

BACKGROUND

A core drilling machine uses a cylindrical diamond-tipped drill bit to cut a ring-shaped groove into a workpiece that is to be worked in order to create a cylindrical drill core there which can then be removed in its entirety from the drilled hole. The material can be, for example, concrete, masonry, stone or the like.

Numerous technical problems can arise during the individual phases of a core drilling procedure. Particularly during the so-called spot-drilling phase, that is to say, the phase when the drill bit is placed onto the workpiece that is to be worked and the core drilling procedure is started, undesired oscillations or vibrations can be exerted onto the drill bit and onto the core drilling machine. These oscillations or vibrations can often also lead to resonances in the drill bit and in the core drilling machine, thereby greatly impairing the drilling procedure.

These oscillations or vibrations and ultimately also the resonances usually arise in that, during the early phase of the core drilling procedure (spot-drilling phase), the drill bit has not yet penetrated deep enough into the material that is to be worked and therefore, the rotating drill bit is not yet being sufficiently guided in the hole that is being drilled. However, it can also be the case that, during later phases of the core drilling procedure, when the drill bit apparently already has sufficient guidance in the hole being drilled, undesired oscillations or vibrations and consequently also resonances might occur. Even during these later drilling phases, these oscillations, vibrations and resonances lead to insufficient operation.

Generally speaking, oscillations, vibrations and resonances should be avoided during a core drilling procedure since they exert severe mechanical and dynamic loads on the drilling tools which, in turn, can give cause damage to the drill bit, to the drilling machine and/or to the drill stand. Moreover, this can translate into poor drilling results in the form of crooked drilled holes that do not run at the prescribed angle (e.g. 90°) relative to the surface of the material that is to be worked.

Furthermore, these oscillations, vibrations and resonances also entail certain safety risks. A user could be tempted to try to provisionally reduce the vibrations, that is to say, by placing auxiliary means onto the drill bit, for example, the user's own foot. This, however, might cause injury to the user and/or cause damage to the core drilling machine.

As a measure aimed at avoiding the undesired oscillations and vibrations, the rotational speed of the drill drive and thus the drilling speed are usually reduced, as a result of which the drill advances altogether more slowly. As a consequence, the core drilling procedure is prolonged, thus rendering the drilling procedure altogether inefficient.

SUMMARY OF THE INVENTION

It is an object of the present invention to provide a method to control a power tool comprising a drive to drive a tool and a control unit for when a workpiece is being worked. Moreover, it is an objective of the present invention to also put forward a system device that uses this method. Due to the method according to the invention as well as the system device according to the invention, the above-mentioned drawbacks are overcome and the working of the material transpires more efficiently.

The present invention provides a method to control a power tool comprising a drive to drive a tool and a control unit for when a workpiece is being worked, encompassing the following method steps:
specifying the rotational speed of the drive at a first value,
measuring a first amplitude of a signal,
filtering the signal within a prescribed frequency range,
measuring a second amplitude of the filtered signal,
reducing the rotational speed of the drive to a second value if the first amplitude exceeds a first prescribed quantity and if the second amplitude exceeds a second prescribed quantity, and
incrementally increasing the rotational speed to the first value, whereby each incremental increase of the rotational speed only takes place once the first amplitude remains below the first prescribed quantity for a prescribed time interval, and the second amplitude remains below the second prescribed quantity.

Moreover, a power tool is provided that uses this method and it comprises:
a drive to drive a tool,
an acceleration sensor to measure a first amplitude and a second amplitude of a signal,
a filter to filter the signal within a prescribed frequency range, and
a control unit to control at least the rotational speed of the drive.

BRIEF DESCRIPTION OF THE DRAWINGS

The invention will be explained in greater detail on the basis of advantageous embodiments, whereby the following is shown.

DETAILED DESCRIPTION

Figure 1:
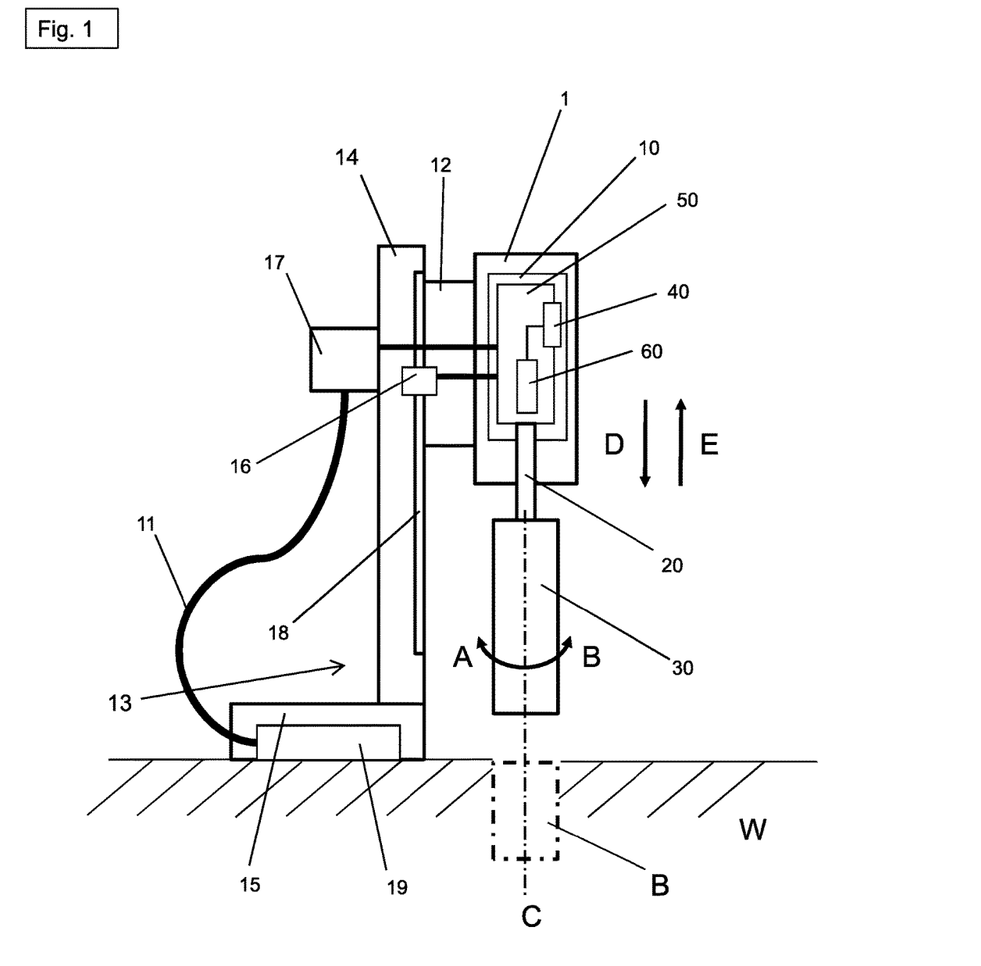
FIG. 1: a power tool according to the invention, having a tool on a tool stand, for core drilling into a horizontally oriented material.
Figure 2:
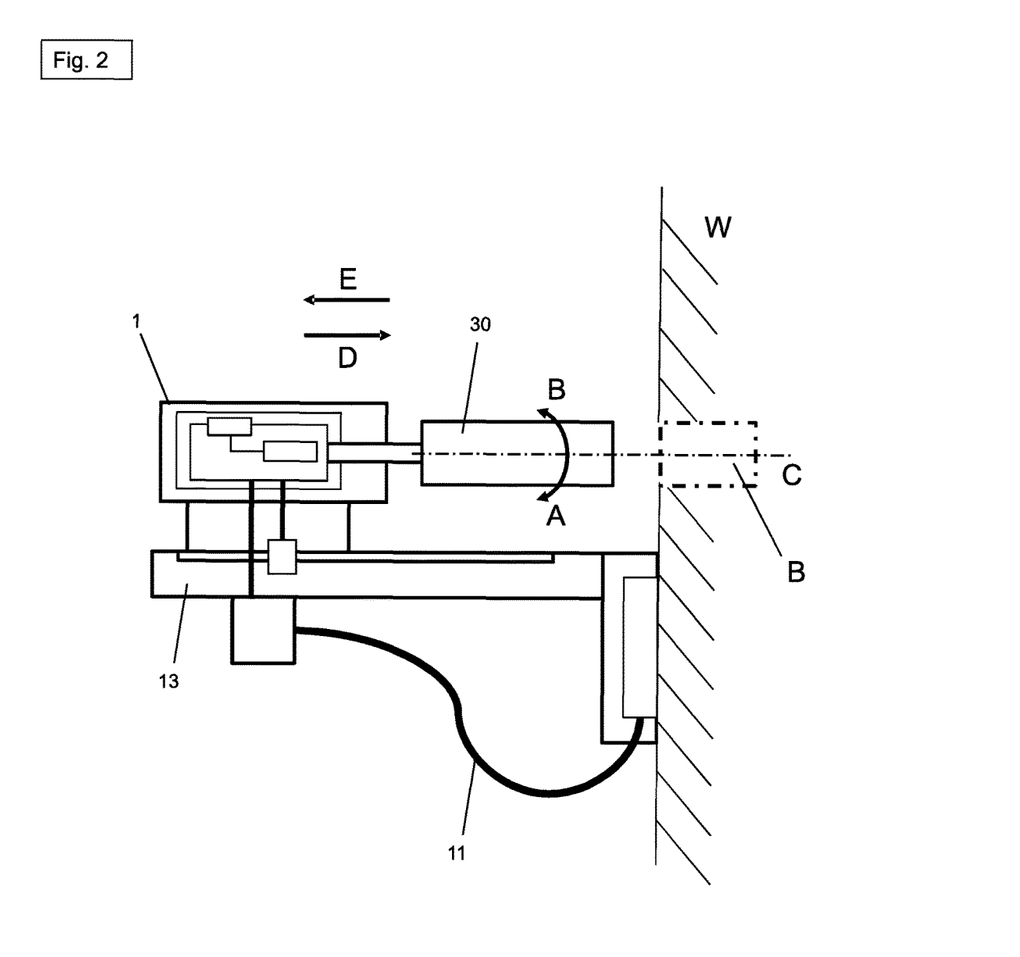
FIG. 2: the power tool according to the invention, having the tool on the tool stand, for core drilling into a vertically oriented material.

FIGS. 1 and 2 show a power tool for working a material such as, for example, concrete, stone, masonry or the like.

The power tool 1 is configured in the form of a core drilling machine and it comprises a drive 10, a drive shaft 20, a tool 30 in the form of a drill bit, an acceleration sensor 40, a control unit 50 and a filter 60.

As likewise shown in FIG. 1, the power tool 1 can be detachably fastened to a tool stand 13 by means of a feed mechanism 12. The feed mechanism 12 serves to automatically move the power tool 1 relative to the tool stand 13 reversibly along the direction of arrows D and E by means of a drive. The tool stand 13 has a guide means 14, a foot element 15, a position and distance sensor 16 as well as a vacuum pump 17. The guide means 14 has an elongated guide element 18 on which the feed mechanism 12 can be held and reversibly moved along the direction of arrows D and E. The power tool 1, in turn, is detachably attached to the feed mechanism 12. The feed mechanism 12 and the guide means 14 can move the power tool 1 in a controlled manner towards and away from a material W that is to be worked. The foot element 15 has a fastening element 19 that is connected to the vacuum pump 17 via a hose 11. The vacuum pump 17 can be used to generate a vacuum in the fastening element 19, as a result of which the tool stand 13 and the power tool 1 attached thereto can be held against a substrate or against the material W that is to be worked. The vacuum pump 17 is connected to the control unit 50 via a data line 51. The vacuum pump 17 can be controlled and regulated by means of the control unit 50, as a result of which the contact force of the fastening element 19 in the foot element 15 can be controlled and regulated. As shown in FIG. 2, the tool stand 13 with the power tool 1 can also be fastened on a vertical wall or to a vertical material W in order to carry out horizontal core drilling into the material W.

The position and distance sensor 16 is situated between the elongated guide element 18 of the guide means 14 and the feed mechanism 12, and it is connected to the control unit 50 as well as to the feed mechanism 12. By means of the control unit 50, the measured data and parameters of the position and distance sensor 16 can be stored, processed and made available for other work procedures. The position and distance sensor 16 serves, on the one hand, to ascertain the position of the feed mechanism 12 relative to the elongated guide element 18 or to a prescribed starting position, and, on the other hand, to measure the distance traveled by the feed mechanism 12 on the elongated guide element 18. On the basis of the position and path measurements, it is always possible to ascertain the position of the power tool 1 or of the tool 30 relative to the material W as well as the distance already traveled by the power tool 1 or by the tool 30 in the material W, that is to say, in the drilled hole B. This makes it possible to ascertain, for instance, the depth of the drilled hole or the remaining time or distance to be traveled until the desired drilling depth is reached. Moreover, the position and distance measurement also allows the determination that a material W such as, for example, a wall, has been drilled through if the thickness of the material W that is to be worked is known. On the basis of the transmission of the information to the control unit 50 indicating that the material W has been drilled through, the control unit 50 can either reduce the rotational speed of the rive 10 to a minimum or else completely stop the drive 10, for instance, in order to save energy.

The drive 10 is configured in the form of an electric motor although it is also possible to use any other suitable motor or drive modality.

The drive shaft 20 is connected to the drill bit 30 and it transmits the torque generated by the drive 10 to the drill bit 30. Owing to the generated torque and to a corresponding contact pressure that is exerted onto the drill bit 30, the drill bit 30 serves to drill a hole B into the material W.

The control unit 50 is positioned in the power tool 1 and connected to the drive 10, the position and distance sensor 16, the acceleration sensor 40, the vacuum pump 17 and the filter 60. The control unit 50 serves primarily to control as well as regulate the parameters and especially the rotational speed of the drive 10. As already described above, the control unit 50 also controls and regulates the vacuum pump 17 and it collects as well as processes data form the position and distance sensor 16, from the filter 60 and from the acceleration sensor 40.

The acceleration sensor 40, which can also be referred to as an acceleration measuring device, an accelerometer, an A-sensor or a G-sensor is connected to the control unit 50 and serves to measure acceleration values. The measurement of the acceleration values makes it possible to detect vibrations or oscillations on the power tool 1, on the tool 30, on the tool stand 13 as well as on the foot element 15. The detection of vibrations and oscillations in the foot element 15 especially serves to ascertain whether critical threshold values pertaining to the vibrations and oscillations have been exceeded, which could cause the foot element 15 of the tool stand 13 to be detached from the substrate or from the material that is to be worked. If critical threshold values pertaining to the vibrations and oscillations have been exceeded, the control unit 50 can be used to raise the output of the vacuum pump 17, so that the contact force is likewise raised correspondingly, in order to prevent the foot element 15 from being detached from the material that is to be worked due to the vibrations and oscillations.

If the tool stand 13 is used without the foot element 15 with a connected vacuum pump 17 but, instead, a tool stand 13 with a foot element 15 that is attached by means of a number of bolts or screws to the material W that is to be worked, then the acceleration sensor 40 likewise serves to detect vibrations and oscillations in the foot element 15 that might indicate a possible detachment of the bolts or screws.

Moreover, the acceleration sensor 40 also serves to ascertain the position or orientation the power tool 1, that is to say, based on the force of gravity, the acceleration sensor 40 can determine whether the power tool 1 with the tool stand 13 is secured to the horizontally oriented material W (on the floor in FIG. 1) or else to a vertically oriented material W (on a wall in FIG. 2). As will be described in detail below, this orientation or position of the power tool 1 is particularly important when it comes to ending the core drilling procedure.

The filter 60 is likewise connected to the control unit 50 and its function is to filter certain frequencies of a measured signal so that only certain frequencies or a certain frequency range is filtered out and made available. The measured signal in the present case is the acceleration value that is generated by the oscillations and vibrations on the power tool 1 and on the tool 30.

During the core drilling procedure, the drive 10 of the power tool 1 transmits a torque via the drive shaft 20 to the tool 30 configured as a drill bit, thus imparting said tool 30 with a rotational movement around the axis C in the direction of arrow A or B. In this context, the rotational speed of the drive 10 and of the drill bit 30 corresponds to a relatively low value, that is to say, to a spot-drilling rotational speed or velocity. The drill bit 30 operated at the spot-drilling speed is then moved downwards in the direction of arrow D onto the material W. The tool stand 13 described above serves to ensure that the power tool 1 and the drill bit 30 can be moved in a controlled manner.

After completion of the core drilling procedure, the drill bit 30 is pulled in the direction of arrow E out of the hole B that was drilled into the material W. However, in this process, the drill bit 30 is not pulled completely out of the drilled hole B in one motion. Particularly in those cases in which the drilled hole B is to be made into a vertically oriented material W (see FIG. 2), for safety reasons, at least a minimum length of the drill bit 30 should stay in the drilled hole B after the drilling procedure has ended. As already described above, the acceleration sensor 40 can be used to ascertain whether the power tool 1 and the tool stand 13 are attached to a horizontally oriented material W (on the floor in FIG. 1) or else to a vertically oriented material W (on a wall in FIG. 2). Once the drilling procedure has ended, the drill core (not shown here) is inside the drill bit 30, as a result of which a relatively high additional weight is exerted on the drill bit 30. This additional weight of the drill core could cause the tool stand 13 with the power tool 1 to become detached from the vertically oriented material W, that is to say, from the wall (see FIG. 1), and to fall. In view of the fact that at least a minimum length of the drill bit 30 remains inside the drilled hole B, it can be ensured that the drill bit 30 is still being supported in the drilled hole B and that the full weight of the drill bit 30 and of the drill core are not exerted on the attachment of the tool stand 13 on the vertically oriented material W, that is to say, on the wall (see FIG. 1). As already mentioned above, the position and distance sensor 16 as well as the control unit 50 serve to detect the position of the drill bit 30 in the drilled hole B, as a result of which the procedure of pulling the drill bit 30 out of the drilled hole B can be properly stopped if at least a minimum length of the drill bit 30 is still inside the drilled hole B. This minimum length can be, for example, half the length of the drill bit 30 or else just a few centimeters. The minimum length depends on a number of parameters such as, for instance, the diameter of the drill bit, the length of the drill bit, the type of attachment of the tool stand 13 to the material W and on the material W itself, and it can be preset by the control unit 50.

Figure 4:
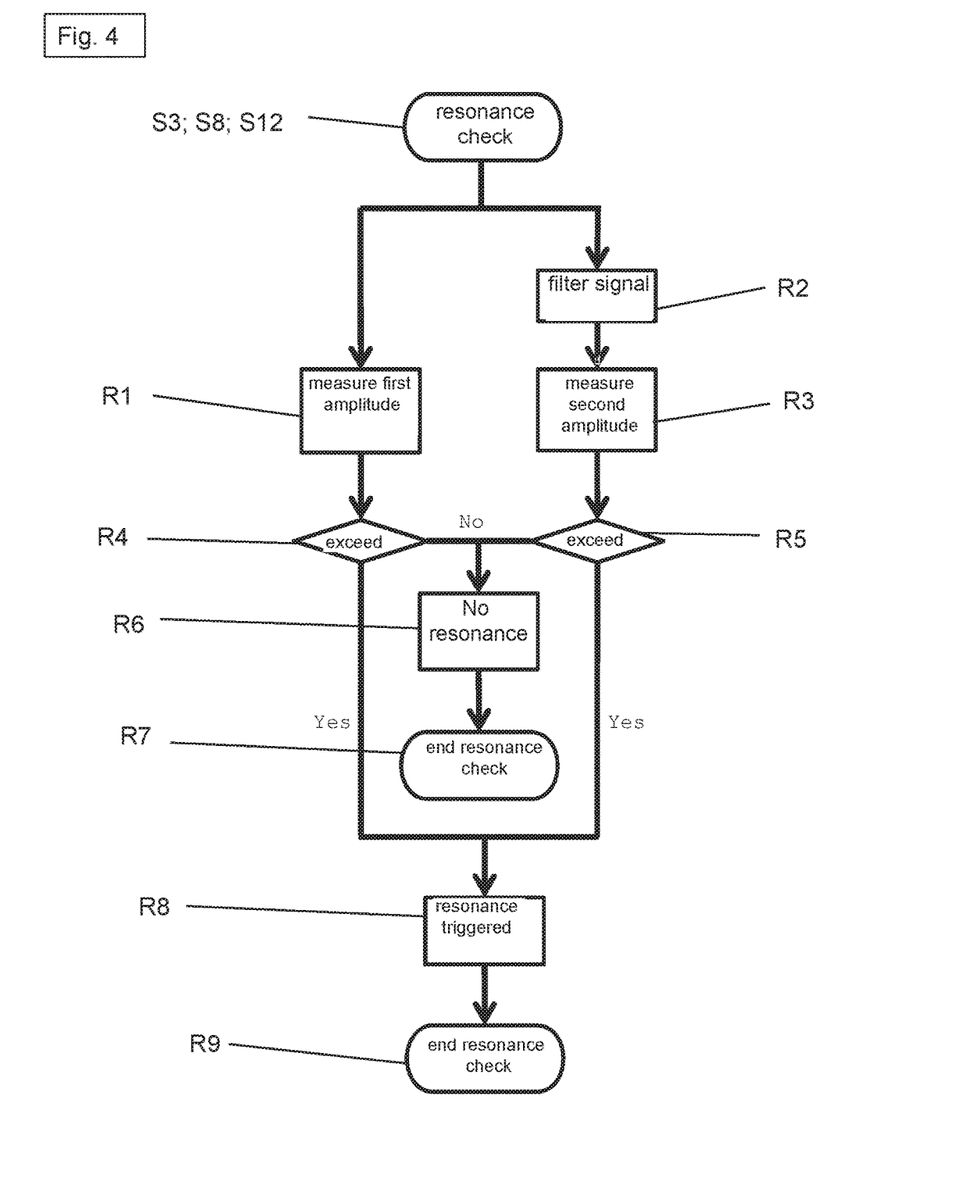
FIG. 4: a flow chart of a resonance check as an integral part of the method according to the invention.
Figure 5:
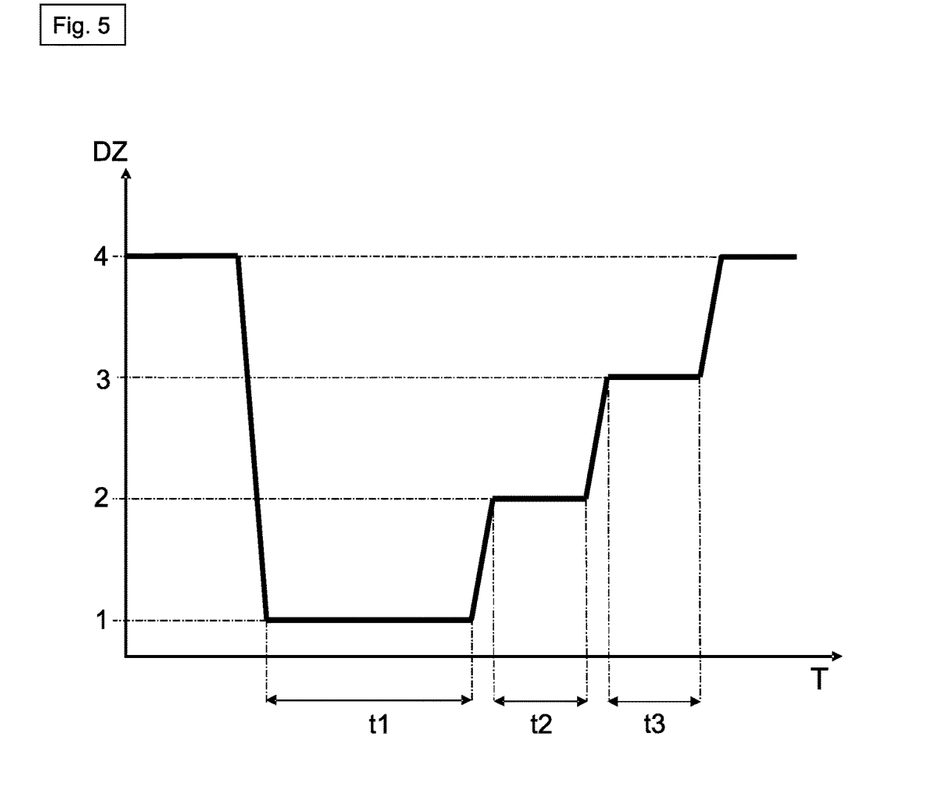
FIG. 5: a graph about the time-related adaptation of the motor rotational speed during the drilling procedure.

The control method for the power tool 1 in the case of a resonance generated by oscillations and vibrations on the power tool 1 and especially on the tool 30 will be described below making reference to FIGS. 3, 4 and 5.

Figure 3:
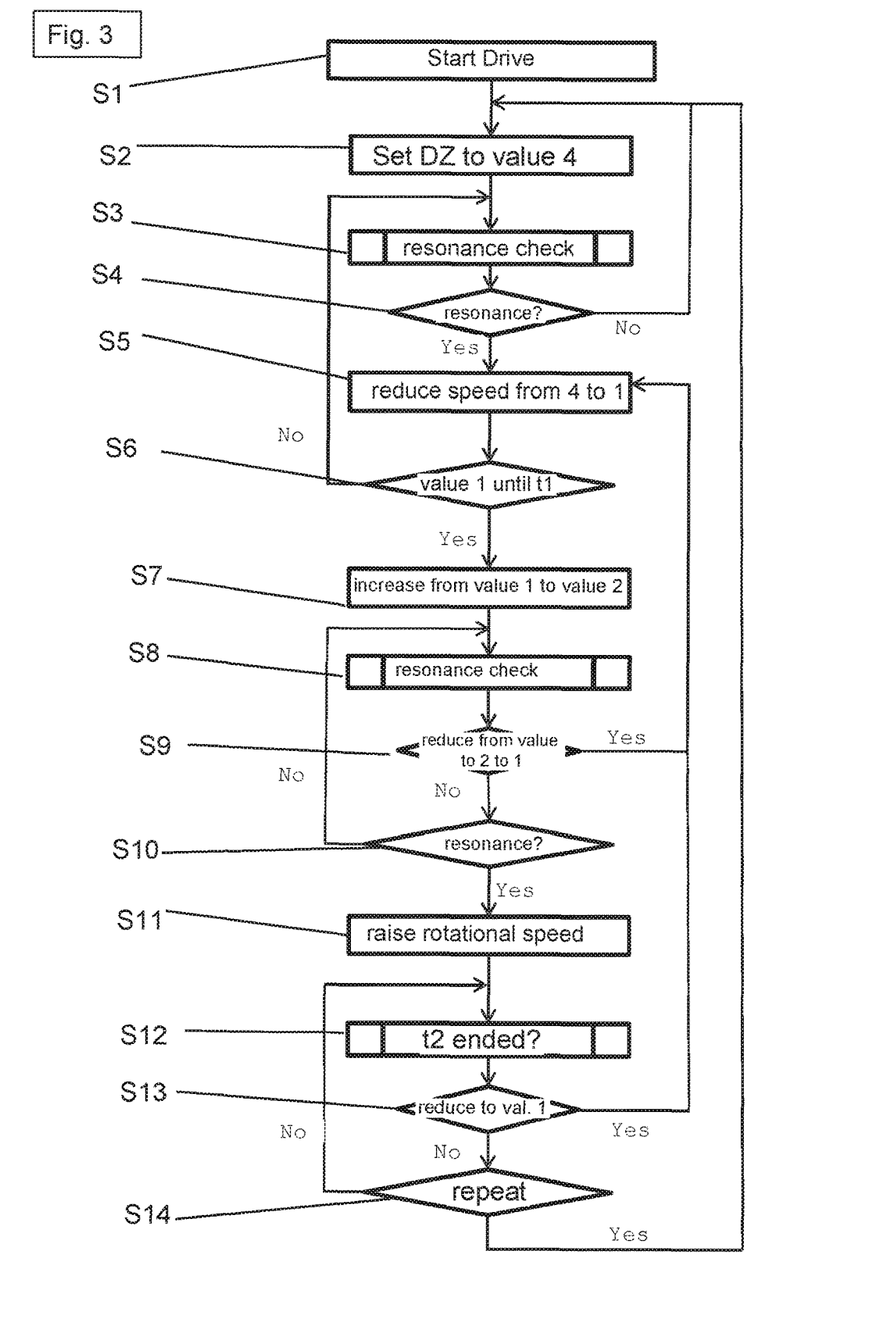
FIG. 3: a flow chart of the control method according to the invention.

As shown in FIG. 3, the operation of the power tool 1 to carry out a drilling procedure begins with step S1 when the drive 10 of the power tool 1 is started. In this process, in step S2, the rotational speed DZ of the drive 10 is set to a value 4 (see FIG. 5). In step S3, the resonance is checked, that is to say, it is checked whether a resonance has been triggered on the power tool 1 by oscillations and vibrations. The resonance check is presented in detail in FIG. 4. During the resonance check, the acceleration sensor 40 is employed in step R1 in order to measure a first amplitude of a signal in the form of an oscillation or of vibrations. Moreover, in step R2, the filter 60 filters this signal in such a way that only a certain frequency range of the oscillation or vibration signal is present. A second amplitude of this oscillation or vibration signal, which is filtered within a certain frequency range, is then measured in step R3 by means of the acceleration sensor 40.

In step R4, the control unit 50 checks whether the first amplitude of the oscillation or vibration signal exceeds a first prescribed quantity. By the same token, in step R5, the control unit 50 checks whether the second amplitude of the oscillation or vibration signal exceeds a second prescribed quantity.

If the first amplitude does not exceed the first quantity and/or the second amplitude does not exceed the second quantity, the control unit in step R6 determines that there is no resonance. The resonance check is thus ended in step R7. Therefore, in step S4, the determination is made that there is no resonance and the rotational speed of the drive 10 remains at a value 4 (see FIG. 5).

However, if the first amplitude exceeds the first quantity and if the second amplitude exceeds the second quantity, the control unit 50 makes the determination in step R8 that there is a resonance triggered by the oscillations or vibrations. The resonance check is thus ended in step R9 (see FIG. 4). Therefore, in step S4, the determination is made that there is a resonance, as a result of which the control unit 50 in step S5 reduces the rotational speed of the drive 10 from the value 4 to the value 1 in order to eliminate the resonance in this manner (see FIG. 5). In this context, the value 1 for the rotational speed is selected in such a way that there is no resonance at this value 1 at any point in time. In step S6, the drive remains at the value 1 until the end of a prescribed time interval t1. After the end of this time interval t1, the rotational speed of the drive 10 is increased from value 1 to value 2 in step S7 (see FIG. 5). In this context, the value 3 for the rotational speed of the drive 10 is greater than the value 2 but lower than the value 1. If the time interval t1 has not yet ended after the resonance check S3 has been completed, then another resonance check S3 is carried out.

In step S8, another resonance check is carried out. This resonance check in Step S8 corresponds to the resonance check described above in step S3 according to FIG. 4. If there is a resonance, the rotational speed of the drive 10 is reduced from value 2 back to value 1 in step S9 since, at the value 1 for the rotational speed, there is definitely no resonance. However, if it is ascertained by the control unit 50 in step S9 and after the end of a time interval t2 in step S10 that there is no resonance, then, in step S11, the rotational speed of the drive 10 is raised to a value 3, see FIG. 3. In this context, the value 3 for the rotational speed of the drive 10 is greater than the value 2 and greater than the value 1 but smaller than the value 4. If the time interval t2 has not yet ended after the resonance check S8 has been completed, then another resonance check S8 is carried out.

In step S12, another resonance check is carried out. This resonance check in Step S12 again corresponds to the resonance check described above in step S3 or in step S8 according to FIG. 4, see FIG. 5. If there is a resonance, the rotational speed of the drive 10 is reduced from value 3 back to value 1 in step S13 since, at the value 1 for the rotational speed, there is definitely no resonance. However if it is ascertained by the control unit 50 in step S14 and after the end of a time interval t3 that there is no resonance, then the rotational speed of the drive 10 is raised to a value 1, see FIG. 5. If the time interval t3 has not yet ended after the resonance check S12 has been completed, then another resonance check S12 is carried out.

The method described above with the steps S1 to S14 together with the steps R1 to R9 are repeated during a drilling procedure.

What is claimed is:

1. A method to control a power tool with a drive to drive a tool and a controller for when a workpiece is being worked, the method comprising:

specifying a rotational speed of the drive at a first value;
measuring a first amplitude of a signal;
filtering the signal within a prescribed frequency range;
measuring a second amplitude of the filtered signal;
reducing the rotational speed of the drive to a second value if the first amplitude exceeds a first prescribed quantity and if the second amplitude exceeds a second prescribed quantity; and
incrementally increasing the rotational speed of the drive to the first value or a further value, whereby each incremental increase of the rotational speed only takes place once the first amplitude remains below the first prescribed quantity for a prescribed time interval, and the second amplitude remains below the second prescribed quantity.

2. A power tool implementing the method as recited in claim 1, the power tool comprising:
- the drive to drive the tool;
- an acceleration sensor to measure the first amplitude and the second amplitude of the signal;
- a filter to filter the signal within the prescribed frequency range; and
- the controller to control at least the rotational speed of the drive.

3. The method as recited in claim 1 wherein the incrementally increasing is a function of the second amplitude.

4. The method as recited in claim 1 wherein the first amplitude and the second amplitude are used to determine is a resonance has been triggered by running the drive at the rotational speed.

5. The method as recited in claim 1 further comprising carrying out a further resonance check after the incrementally increasing step.

6. The method as recited in claim 5 further comprising further reducing the rotational speed to a further reduced value if resonance is found in the further resonance check.

7. The method as recited in claim 6 wherein the reducing step reduces the rotational speed of the drive from a value 4 to a value 1, and the incrementally increasing raises the rotational speed from the value 1 to a value 2, and the further reducing step further reduced the rotational speed from the value 2 to the further reduced value, the further reduced value being the value 1.

8. The method as recited in claim 1 wherein the incrementally increasing increases the rotational speed to the further value, the further value being less than the first value.

* * * * *